3,299,151
PREPARATION OF POLYETHER POLYOLS
Marco Wismer, Gibsonia, and Herman P. Doerge and John R. Peffer, Springdale, Pa., assignors to Pittsburgh Plate Glass Company, Pittsburgh, Pa., a corporation of Pennsylvania
No Drawing. Filed Oct. 8, 1963, Ser. No. 314,615
5 Claims. (Cl. 260—615)

This invention relates to a process for producing polyether polyols. More particularly, it pertains to a process for producing alkylene oxide polyether polyols of sufficient purity that said polyols may be utilized in the preparation of flexible polyurethane foam. This process involves the reaction of an alkylene oxide and a polyhydroxy compound in the presence of an alkaline metal hydroxide and subsequent purification of the crude alkylene oxide polyether polyol.

Polyether polyols prepared from alkylene oxides have been utilized in lubricants, emulsifiers, plasticizers, solvents, and as an important intermediate in the preparation of flexible polyurethane foams. In this latter application, the purity of the polyether polyol is of particular importance in regard to color, water, acidity, and catalyst residue. The following specifications indicate the purity generally required for alkylene oxide polyethers used in flexible polyurethane foams:

| | Specification, maximum |
|---|---|
| Water, percent | 0.1 |
| Acid number, milligrams KOH per gram of polymer | 0.2 |
| Sodium and/or potassium, parts per million | 10 |
| Color (APHA) | 75 |
| Gel test:[1] | |
| Time (seconds) | 20 |
| Color (Gardner) | 3½ |

[1] See description of Gel Test after Example VII.

The production of a polyether polyol from alkylene oxides is ordinarily carried out by the addition of the alkylene oxide to a polyhydroxy compound in the presence of an alkali metal hydroxide at temperatures of about 80° C. to about 160° C. The alkali catalyst is usually present in quantities of about 0.2 percent to 1.0 percent by weight of the reactants. A typical method includes the reaction of propylene oxide with propylene glycol in the presence of potassium hydroxide.

Polyhydroxy compounds can be utilized as an initiator, which term as used in this application designates a compound which reacts with an alkylene oxide molecule to start the polymerization reaction. Initiators useful in the above method include:

Ethylene glycol
Propylene glycol
Diethylene glycol
Glycerol
Triethanolamine
Trimethylolethane
Trimethylolpropane
1,2,6-hexanetriol
Pentaerythritol and like polyols. Alkylene oxides conventionally used include lower alkylene oxides such as ethylene oxide, propylene oxide, and butylene oxide. Catalysts other than potassium hydroxide include sodium hydroxide, lithium hydroxide, and the like. Mixtures of the various alkylene oxides may be utilized and a variation of the above process may be practiced wherein one alkylene oxide is first reacted with the polyhydroxy initiator followed by the addition of another alkylene oxide to the polyether polyol, as for example, polypropylene oxide polyether polyols terminated with ethylene oxide.

In general, alkylene oxide polyether polyols prepared by the above method may be represented by the formula $$R-[O(R_1-O)_nH]_x$$

in which $n$ has a value of about 4 to about 400, $x$ is a number from 1 to 8, R is a hydroxyalkyl group or an alkyl group when $x$ exceeds 1 and $R_1$ is a group selected from the class consisting of ethylene, 1,2-propylene, and 1,2-butylene groups. In the above formula, $R_1$ should not be considered as being limited to one particular group for any particular polyol, inasmuch as ethylene oxide and propylene oxide may be copolymerized, or as frequently practiced, a propylene oxide polyether polyol may be terminated with ethylene oxide, that is, the terminal groups would be hydroxyethyl groups.

As readily seen from the above polyether polyol specifications, the content of alkali metal in the polyether polyol is critical. Consequently, various methods have been utilized to reduce the residual alkaline materials in the final product. Among these methods are included the neutralization of the alkaline materials with hydrochloric acid followed by separation of precipitated alkali metal salts and removal of excess acid. This method is described in U.S. Patent 3,016,404. The neutralization method employing hydrochloric acid was an improvement over neutralization methods employing sulfuric acid, phosphoric acid, carbon dioxide, and the like inasmuch as removal of excess acid is an important feature as a low acid value is another of the requisites of a polyether polyol designed for use in flexible polyurethane foams. Since determination of the exact amount of acid necessary to neutralize the residual catalyst is extremely difficult, an excess of acid is conventionally used; thus, excess acid must be readily removable from the polyether polyol.

Another method for effectively neutralizing the residual alkaline materials and removal of same involves the use of solid organic acids. This method is described in U.S. Patent 3,000,963. Solid organic acids such as oxalic, benzoic, citric, succinic, fumaric, phthalic, and the like were utilized to neutralize the residual alkaline materials in the crude polyether polyol. Excess acid and the precipitated alkali metal salt were subsequently removed by filtration. One of the requirements of the solid organic acid utilized in this method is non-solubility in the polyether polyol at all process temperatures.

Each of the above patented processes have certain advantages and disadvantages. The hydrochloric acid method is advantageous in that effective neutralization occurs rapidly and excess acids can be removed as a gas by stripping means. The solid organic acid mehod is advantageous in that the acids utilized are relatively noncorrosive. The hydrochloric acid process is disadvantageous in that the acid is very toxic and corrosive, while in the solid organic acid method the neutralization with a non-soluble, solid acid is somewhat less efficient than with a liquid, soluble acid and the excess acid presents more solids which must be somewhat laboriously removed by filtration or similar means. Accordingly, it is an object of this invention to provide a method for purifying an alkylene oxide polyether polyol which combines the advantages of each of the foregoing methods.

It has now been discovered that formic acid can be employed as an effective agent for neutralizing the residual alkaline materials in the polyether polyol. It has further been discovered that excess formic acid can be removed readily from polyether polyol by stripping means, such as purging with an inert gas or by stripping under vacuum, or by removal with an appropriate ion exchange resin. Furthermore, the precipitate resulting from the reaction of formic acid and said alkaline materials is readily separated from the alkylene oxide polyether. These alkaline materials consist primarily of residual catalyst, that is, alkali metal hydroxide; however, alkali metal alkoxides and the like are frequently present as a result of reactions of alkylene oxides with alkali metal hydroxides.

It is surprising that formic acid effectively neutralizes and precipitates the residual alkali metal ion in the alkylene oxide polyether inasmuch as trichloroacetic acid, a much stronger acid, does not efficiently neutralize and precipitate residual catalyst.

Formic acid is also particularly suited as a means of removing alkali metal residue as it is less corrosive than hydrochloric acid yet it can be readily admixed in either a liquid or gaseous state with the crude polyether. Furthermore, excess formic acid can be readily removed from the polyether by stripping means.

Generally, the purification of a polyether polyol prepared from an alkylene oxide comprises the following steps: (1) the removal of excess alkylene oxide monomers, (2) the precipitation of residual alkaline materials and subsequent separation of the precipitate from the polyether polyol, and (3) the removal of any excess acid used to precipitate the alkali metal ion.

The order of the above steps may be interchanged although if excess alkylene oxide monomer is used it is preferred to effect its removal prior to the formic acid addition. Frequently, however, the excess acid is removed prior to the removal of the precipitate.

In the instant invention, the first step, i.e., removal of excess alkylene oxide, is ordinarily accomplished in a conventional manner, such as the passing of inert gas, for example, nitrogen, carbon dioxide or the like, through the crude polyether at an elevated temperature of the order of about 90° C. to about 180° C. The term "inert gas" as used in this specification and appended claims describes a gas which is inert towards the polyether polyol itself, even though the gas may be reactive towards other ingredients in the crude polyether mixture, such as alkali metal hydroxides, alkylene oxides or the like. This step is not always necessary, however, as the reaction of the alkylene oxide may be continued until such minor quantities of alkylene oxide remain in the polyether polyol that removal prior to the addition of acid is unnecessary. In general, it is preferred to remove excess alkylene oxide prior to the addition of acid for otherwise alkanoic acids are formed which are difficult to remove, but must be removed to decrease the acidity to the maximum specified for polyether polyols for flexible foams.

The second stage, i.e., neutralization step of the instant invention, employs formic acid to neutralize residual alkali metal hydroxide catalyst and other alkaline materials present, such as alkali metal alkoxides, in the crude polyether polyol. The formic acid utilized is generally about 5 percent to 10 percent in excess of the number of equivalents required to neutralize the residual catalyst. A greater excess of acid may be used; however, it is preferable to utilize a small excess as excess acid must later be removed.

The formic acid utilized may be liquid anhydrous formic acid, aqueous formic acid, or gaseous formic acid.

The procedure using anhydrous or aqueous formic acid involves the addition of a quantity of acid calculated to be about 5 percent to about 10 percent in excess of the number of equivalents of acid required to neutralize the residual alkali metal in the polyether polyol. After the acid is added, the mixture is mildly agitated for about 1 to about 6 hours. The pH of the acidified polyether polyol should be from about 7.0 to about 2.0. If the pH is above about 7.0, small additions of formic acid should be made until the pH falls within the proper range. It is preferred, however, to reduce the pH of the crude polyether polyol to about 4.0 to about 6.0 inasmuch as the alkali metal may not be quantitatively precipitated at a pH of more than 6.0 and at a pH of less than 4.0 the excess acid becomes more difficult to remove.

When either anhydrous formic acid or aqueous formic acid is utilized, the separation of the resulting precipitate is accomplished in a similar manner. The precipitate may be first agglomerated by the addition of a coagulating agent, such as calcium carbonate, prior to separation. Separation may be accomplished by filtration, centrifugation, and like means. Also, the use of a filter aid may improve the efficiency of subsequent filtrations. Ease and efficiency of filtration is an important feature of the instant invention inasmuch as an exceptionally pure product is necessary in a minimum of filtration time. The present invention is especially desirable as a pure polyether polyol is obtainable in a relatively short time.

Gaseous formic acid can be bubbled through the crude polyether until the alkaline materials are substantially completely neutralized, as indicated by a pH in the range of 7.0 to about 2.0. By maintaining the temperature of the polyether polyol and gaseous formic acid above the liquification temperature (boiling point) of the formic acid, a major part of the excess formic acid passes through the polyether without condensing; thus, the polyether contains a minimum of excess acid.

The third step, or acid removal step, may be accomplished by passing an inert gas such as nitrogen or carbon dioxide through the alkylene oxide polyether polyol at an elevated temperature of about 90° C. to about 180° C. An alternative means of removing the acid involves vacuum stripping of the acid at elevated temperatures of about 50° C. to about 180° C. The acid removal step effectively removes substantially all the water present in the alkylene oxide polyether and any volatile organic acids present which may have been formed from oxidation of excess alkylene oxide monomer not removed in the first stage.

Alkylene oxide polyether polyols purified in the manner described above meet the stringent specifications established for polyether polyols useful in flexible polyurethane foams.

The following examples illustrate in detail the novel process of this invention. The examples are not intended to limit the invention, for there are, of course, numerous possible variations and modifications.

EXAMPLE I

A propylene oxide polyether polyol was prepared from the following ingredients:

| | Parts |
|---|---|
| Glycerine | 2,720 |
| Propylene oxide | 13,600 |
| Potassium hydroxide (85 percent) | 96.5 |

The glycerine and potassium hydroxide were charged to a reaction vessel equipped with temperature measuring device and heat transfer means, and capable of withstanding pressures of about 150 p.s.i.g. The above mixture was heated to about 190° F. and purged with dry nitrogen before the addition of propylene oxide was begun. The propylene oxide was added in small increments over a period of about six hours.

During the reaction the temperature was maintained at about 220° F. to about 250° F. and the maximum pressure reached about 40 p.s.i.g. The reaction product had an OH value of 340.7.

The reaction was continued by charging 2,270 parts of the above reaction product and 80.5 parts of potassium hydroxide to a reaction vessel of the type described above. The mixture was heated to about 200° F. to about 240° F. for a period of about six hours during which period a total of 14,200 parts of propylene oxide were added in incremental amounts. The pressure was allowed to drop and about 15,700 parts of a propylene oxide polyether polyol having a hydroxyl number of about 57.0 were recovered.

EXAMPLE II

An attempt to purify 500 grams of a polyether polyol of the type prepared in Example I was conducted as follows:

The polyether polyol was added to a vessel equipped with an agitator, insert gas inlet, and temperature measuring device.

The polyether polyol was heated to a temperature of about 120° C. and maintained at that temperature for about 2 hours while subjected to a vacuum of about 30 millimeters of Hg.

The polyether polyol, now substantially free of unreacted propylene oxide monomer, was allowed to cool. Trichloroacetic acid was then added incrementally at 15 minute intervals to the agitated polyether polyol.

| Trichloroacetic acid additions, grams: | pH polyether polyol |
|---|---|
| 2.0 | 12.3 |
| 0.8 | 11.8 |
| 0.5 | 11.8 |
| 1.8 | 11.5 |
| 3.0 | 11.4 |
| 1.0 | 9.8 |
| 5.0 | 9.6 |
| 3.0 | 8.6 |
| 5.5 | 8.2 |

No further additions of acid were made and the polyether polyol was allowed to stand for several days. The final pH was 9.8 and no precipitate had formed.

This polyether polyol did not meet the specifications set forth above as it was high in alkali metal ion and did not pass the gel test.

EXAMPLE III

Purification of 2000 grams of a propylene oxide polyether polyol of the type prepared in Example I was effected in the following manner:

The polyether polyol was added to a vessel equipped with an agitator, inert gas inlet, and temperature measuring device. The polyether polyol was heated to a temperature of about 120° C. and maintained at that temperature for four hours while dry nitrogen gas was passed through the polyol.

The polyether polyol, now substantially free of unreacted propylene oxide monomer, was allowed to cool to about 80° C. before about 8.0 milliliters of 90 percent formic acid were added. The pH of the polyol was reduced to about 4.0 by the addition of the formic acid. 2.0 grams of 2,6-di-t-butyl-4-methylphenol were then added.

The polyol was agitated for about 3 hours before being reheated to about 100° C. and filtered through a paper filter coated with 50 grams of asbestos fiber as a precoat. A second filtration through a paper filter with about 18 grams of activated carbon was performed.

The filtrate was then heated to about 140° C. and maintained at that temperature for about 3 hours while being purged with an inert gas.

The purified polyether polyol was then cooled and analyzed as follows:

| | |
|---|---|
| Acid value | 0.0274 |
| OH value | 53.8 |
| Water, percent | 0.047 |
| Ash (p.p.m.) | 10 |
| Na (p.p.m.) | 2 |
| K (p.p.m.) | 1 |
| Color (APHA) | 50 |
| Gel test | Passed |
| Color | <1 (Gardner) |
| Viscosity | W+ (Gardner-Holdt) |

EXAMPLE IV

A propylene oxide polyether polyol terminated with ethylene oxide was prepared in a manner similar to Example I but using less propylene oxide initially and adding a small quantity of ethylene oxide at the completion of the propylene oxide reaction. The purification of this polyether polyol was effected as follows:

About 2000 grams of the ethylene oxide terminated polyether polyol were added to a vessel equipped with an agitator, inert gas inlet and temperature measuring device. The polyether polyol was heated to a temperature of about 120° C. and maintained at that temperature for about 2 hours while dry nitrogen gas was passed through the polyol.

The polyether polyol, now substantially free of unreacted alkylene oxide monomers, was allowed to cool to about 80° C. before about 8.0 milliliters of 90 percent formic acid were added. The resulting pH was about 4.4. 2.0 grams of 2,6-di-t-butyl-4-methylphenol were then added.

The polyol was agitated for about 3 hours at 80° C. About 80 grams of finely divided hydrated synthetic calcium silicate were added to the polyol before it was reheated to about 100° C. and filtered through a paper filter. A second filtration was made through a paper filter precoated with about 50 garms of asbestos fiber.

The filtrate was heated to about 140° C. and maintained at that temperature while being purged with dry nitrogen gas.

The purified polyether polyol was then cooled and analyzed as follows:

| | |
|---|---|
| Acid value | 0.0123 |
| OH value | 53.7 |
| Water, percent | 0.032 |
| Ash, p.p.m. | 4.0 |
| Color (APHA) | 50 |
| Gel test | Passed |
| Color | 1+ (Gardner) |
| Viscosity (Gardner-Holdt) | W+ |

EXAMPLE V

Purification of 1000 grams of a polyether polyol of the type prepared in Example I was effected in the following manner.

The polyether polyol was added to a vessel equipped with an agitator, inert gas inlet, and temperature measuring device. The polyether polyol was heated to a temperature of about 110° C. to about 120° C. for about 2 hours while being purged with dry nitrogen gas.

The polyether polyol, now substantially free of unreacted propylene oxide, was allowed to cool to about 80° C. before about 4.0 milliliters of 90 percent formic acid were added. After the pH of the polyol was reduced to about 4.8, 1.0 grams of 2,6-di-t-butyl-4-methylphenol was added and the polyol was agitated for about 1 hour.

About 5 grams of finely divided hydrated synthetic calcium silicate were added to the polyol and heating was resumed. A temperature of about 140° C. was maintained for a period of about three hours while dry nitrogen gas was passed through the polyol. When the acid value reached 0.029, the polyol was cooled to about 100° C. and then filtered. About 5 grams of finely divided hydrated synthetic calcium silicate were added to the filtrate before it was refiltered.

About 853.5 grams of purified polyether polyol were recovered. The purified polyol had an OH value of 57.0, an ash content of 32 p.p.m., and passed the gel test. The properties of the tolylene diisocyanate-polyether polyol mixture were as follows:

| | |
|---|---|
| Color | 3 |
| Viscosity | Z-2 |

EXAMPLE VI

Another 1000 grams of polyether polyol were purified in the manner of Example V, however, the first filtration was made through the filter cake remaining after the second filtration of Example V. A second filtration was made through clean paper after about 5 grams of finely divided hydrated calcium silicate were added to the polyol. About 880 grams of purified polyether polyol were recovered. The purified polyether had an OH value of 57.0, an ash content of 22 p.p.m., and passed the gel test.

The tolylene diisocyanate-polyether polyol mixture had a color of 3 and a viscosity of Z-2.

EXAMPLE VII

Another 1000 grams of polyether polyol were acidified and treated in the manner of Example V, however, 7.5 grams of finely divided hydrated calcium silicate were added before the polyol was heated to about 140° C. and purged. Also, the filtration was achieved in one stage by passing the polyol through a filter precoated with 100 grams of purified polyether polyol from a prior preparation and 10 grams of finely divided hydrated calcium silicate. The polyether polyol filtrate passed the gel test.

The tolylene diisocyanate-polyether polyol mixture had a color of 2 and a viscosity of Y.

Gel test

The gel test utilized in the above examples is performed as follows:

(a) Add to a 25 x 150 millimeter test tube a calculated amount[1] (grams) of polyether and 2.44 grams of tolylene diisocyanate (80/20) of 0.001 percent acidity (expressed as hydrolyzable chlorine) and a maximum color of 150 (platinum cobalt).

(b) Stopper the tube and shake vigorously. Remove the stopper and place the tube in an oil bath at 125° C. for 30 minutes. Remove the tube without stirring and allow to cool for approximately 30 minutes.

(c) Turn the test tube upside down and observe the time (seconds) required for the reaction mixture to reach the mouth of the test tube. A mixture which fails to flow after 60 seconds is a gel.

(d) If the mixture is not a gel, transfer some to a viscosity tube and determine viscosity and color.

Although specific examples of the invention have been set forth hereinabove, it is not intended that the invention be limited solely thereto, but to include all of the variations and modifications falling within the scope of the appended claims.

We claim:

1. A process for purifying a crude lower alkylene oxide-polyether polyol containing an alkali metal hydroxide catalyst, which comprises adding formic acid to said polyether polyol in sufficient quantity to precipitate substantially all of said catalyst in the crude polyether polyol, and removing said precipitate.

2. A process for purifying a crude lower alkylene oxide-polyether polyol containing an alkali metal hydroxide catalyst, which comprises adding formic acid to said polyether polyol in sufficient quantity to reduce the pH to about 2.0–7.0, and removing precipitate formed from the reaction of the formic acid with the catalyst.

3. A process for purifying a crude lower alkylene oxide-polyether polyol containing an alkali metal hydroxide catalyst, which comprises adding formic acid to said polyether polyol in sufficient quantity to reduce the pH to about 2.0–7.0, removing water present and unreacted formic acid by stripping means, and removing precipitate formed by the reaction of formic acid with said catalyst.

4. The process of claim 3 wherein the stripping is carried out utilizing an inert gas stream.

5. The process of claim 3 wherein the polyether polyol is maintained at a temperature in the range of about 90° C. to about 180° C. during the stripping operation.

References Cited by the Examiner

UNITED STATES PATENTS

| | | | |
|---|---|---|---|
| 2,983,763 | 5/1961 | Krause | 260—615 X |
| 3,016,404 | 1/1962 | Beauchamp et al. | 260—615 |
| 3,030,426 | 4/1962 | Moseley et al. | 260—615 |

LEON ZITVER, *Primary Examiner.*

DANIEL D. HORWITZ, *Examiner.*

H. T. MARS, *Assistant Examiner.*

---

[1] Calculated weight of sample = $\dfrac{1560}{\text{OH value of Polyether Polyol}}$

UNITED STATES PATENT OFFICE
CERTIFICATE OF CORRECTION

Patent No. 3,299,151 January 17, 1967

Marco Wismer et al.

It is hereby certified that error appears in the above numbered patent requiring correction and that the said Letters Patent should read as corrected below.

Column 8, line 26, for the claim reference numeral "3" read -- 4 --.

Signed and sealed this 23rd day of July 1968.

(SEAL)
Attest:

Edward M. Fletcher, Jr.
Attesting Officer

EDWARD J. BRENNER
Commissioner of Patents